April 7, 1942.   H. SHRUBSALL   2,278,569
WELDING
Filed May 24, 1940
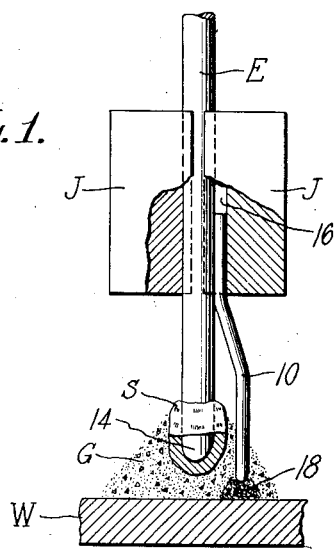
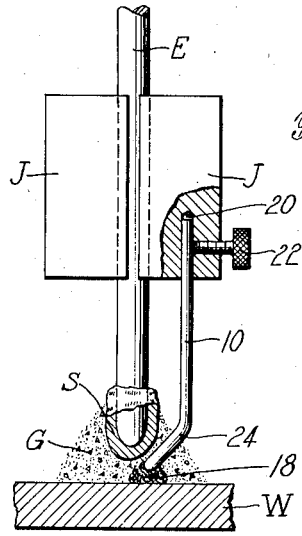
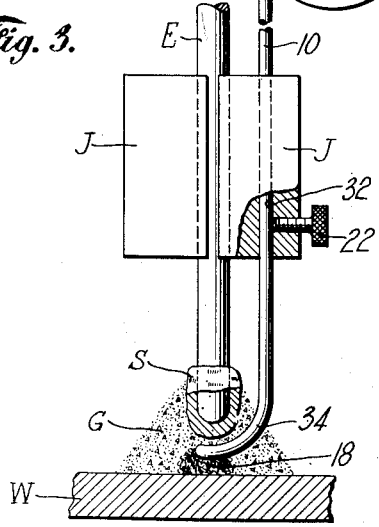
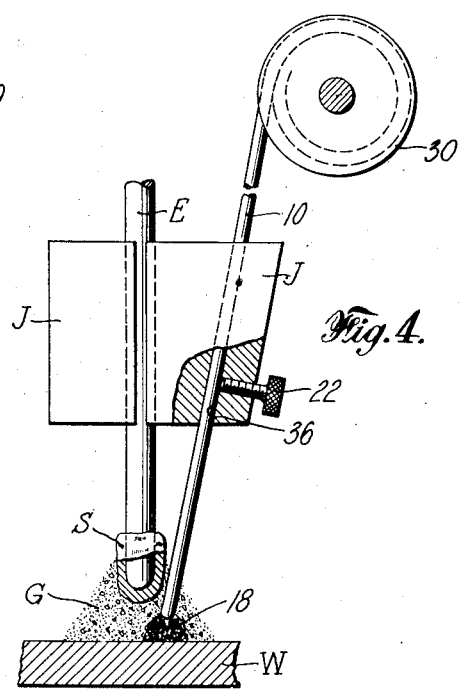
INVENTOR
HARRY SHRUBSALL
BY
ATTORNEY Patented Apr. 7, 1942

2,278,569

UNITED STATES PATENT OFFICE 2,278,569

WELDING

Harry Shrubsall, Niagara Falls, N. Y., assignor to The Linde Air Products Company, a corporation of Ohio Application May 24, 1940, Serial No. 336,921

13 Claims. (Cl. 219—10)

This invention relates to electric welding and more particularly to an improved method of and apparatus for restarting an electric welding operation.

Many electric welding operations involve the use of what is known as a flux or welding material. In some instances, these fluxes are applied in the form of coatings on the electrode or welding rod while in other instances they are separately deposited on the work in the region of the welding operation.

In one method of electric welding, a welding material is used which comprises an unbonded comminuted material composed chiefly of silicates of the alkaline earth metals (magnesium being considered to be one of this family of metals) substantially free from materials which form deleterious amounts of gas at welding temperatures. This welding material is usually pre-fused to complete chemical reaction between the ingredients and is subsequently crushed or ground to the desired size.

In this welding method, a quantity of such material is placed on the surfaces to be united by welding. The electrode is inserted into the material, and an electric current is passed along a main path through the material from the end of the electrode to the work, the end of the electrode being enclosed or blanketed by the welding material. This current is of sufficient magnitude to melt progressive portions of the electrode within said material and to heat and melt progressive quantities of the material. This welding material is substantially non-conductive when cold and offers a relatively high resistance to the passage of the welding current. The heating effect due to the electrical resistance of the material causes a progressive increase in its conductivity as higher temperatures are approached.

When the flow of electric current through the material is stopped, either by intent or by accidental interruption, some of the material which has been fused tends to freeze on the end of the electrode. In its solidified state, it has enough electrical resistance to prevent the passage of an effective welding current between the electrode and the work, and therefore must be removed before the welding is resumed. Heretofore, this has been done mechanically, usually by hand. If the electrode used is formed of carbon or other relatively fragile material, the ends of the electrode are often broken off. This results in considerable wastage of electrode material and of time, and extra work is required to reset the electrode to maintain its proper position. While such difficulties are encountered chiefly when using a bare carbon electrode, they may also be encountered in using a metallic electrode coated with a flux of the type described or any other type which is substantially non-conductive at normal temperatures.

It is therefore among the objects of this invention to provide, in welding operations using a welding material or flux which is a poor conductor when cold, a method of and apparatus for re-starting the flow of electric current between an electrode and the work when the electric current flow has been interrupted; to provide such a method in which damaging or breaking of relatively fragile electrodes will be substantially eliminated; to provide such a method and apparatus in which the welding operation may be re-started without resetting the electrode; and to provide a simple and reliable method of and apparatus for re-starting the flow of current between the electrode and the work through a non-conductive welding material or flux.

These and other objects of the invention will be apparent from the following description and the accompanying drawing, in which:

Fig. 1 is an elevation, partly in section, of one embodiment of the invention;

Fig. 2 is an elevation, partly in section, of another embodiment of the invention;

Fig. 3 is an elevation, partly in section, of a further embodiment of the invention; and Fig. 4 is an elevation, partly in section, of a modified form of the embodiment of the invention illustrated in Fig. 3.

Generally speaking, the objects of the invention are accomplished by heating the solidified welding material or flux independently of the main welding current. Preferably, an auxiliary highly conductive current-conducting path is established through an unfused portion of the welding material from the electrode to the work in parallel with the main welding current path. The heating effect of the current flowing along this auxiliary path will cause the flux or welding material which has fused and solidified on the end of the welding electrode due to interruption of current flow in the main current path, to become heated, thus lowering its resistance and permitting the flow of current along the main welding current path between the operative end of the main electrode and the work to be re-established.

Referring to the drawing, the invention is illustrated as applied to the above-mentioned electric welding method in which a quantity of granular welding material G, of relatively high electrical resistance when cold, is placed in contact with the work indicated at W. An uncoated main welding electrode E is arranged with its lower or operative end inserted in the material G, and the electrode may be clamped or otherwise secured in current conducting means or members, such as contact jaws, plates or clamps J, which may form part of a suitable welding apparatus.

The electric current, when established, flows along a main welding current path from the jaws J through electrode E and material G to the work W. The current is of sufficient magnitude to melt progressive portions of the electrode submerged in the welding material and to fuse progressive quantities of the material. The fused material forms a molten slag S floating on top of the molten metal behind the rod or electrode E, and the end of the electrode E is enclosed and blanketed by a deep layer of material G.

When the flow of electric current is interrupted, this molten slag S solidifies and adheres to the lower end 14 of electrode E. This solidified slag is highly resistant to the flow of electric current and normally must be removed to permit the re-starting of the welding operation.

In accordance with the principles of the invention as illustrated in Fig. 1, an auxiliary electrode such as a wire 10 is operatively secured in electrical contact with the jaws J, as by being inserted in an auxiliary groove or passage 16, which may be provided in the electrode engaging face of one of the jaws J. The auxiliary electrode or wire 10 is in engagement with electrode E and jaw J. Its free end extends beyond the electrode E and jaw J and is bent away from electrode E to extend in spaced substantially parallel relation thereto. If desired, a piece of steel wool or other electrically conductive material 18 is placed between the end of the wire 10 and the work W. When the flow of current is resumed, the current will pass along an auxiliary path from the jaws J through the wire 10 and the pad 18 to the work W. The flow of current causes the pad 18 to melt or burn, and heats the welding material. As the material becomes molten, the slag S formed on the end of the electrode E likewise becomes molten and its resistance decreases. This permits the passage of relatively large currents along the main current path between the electrode E and the work W through the material G, thus restoring the welding operation to its normal condition of operation.

In the embodiment of the invention illustrated in Fig. 2, a bore or passage 20 may be formed in one of the jaws J, in spaced relation to electrode E, to receive the wire 10 which may be held therein by releasable means such as a suitable set screw 22. In this embodiment of the invention, the wire may be bent as at 24 so that the lower or free end thereof is disposed substantially beneath and in spaced relation to the end of the main electrode E and the pad 18 likewise may be disposed immediately beneath the end of the electrode E. This embodiment of the invention functions in the same manner as that of Fig. 1.

A preferred arrangement is illustrated in Fig. 3, wherein a large coil of the wire 10 may be wound upon a reel 30 and threaded through a passage 32 drilled longitudinally through one of the jaws or clamps J. The lower end of the wire may be bent as at 34 and disposed substantially beneath the lower end of the electrode E, preferably in contact with a pad of steel wool or other suitable material 18. Releasable means such as a set screw 22 is provided for holding the wire in fixed position in passage 32. As the wire is burned away in successive re-starting operations, set screw 22 may be loosened and more wire may be withdrawn from the reel 30. In all instances, the end of the wire is bent by hand into a position adjacent the work.

Fig. 4 illustrates a modified form of the above embodiment of the invention, in which the necessity for bending the end of the wire by hand is eliminated. For this purpose, a passage 36 is drilled diagonally through the jaw J at such an angle to the axis of the electrode E that the lower end of the wire 10 will contact the work W or the pad 18 close to but not in contact with the operative end of the main electrode. The wire may thus be conveniently fed from the reel 30, as needed, and no bending will be required.

While the wire has been shown as clamped in the jaw J, the auxiliary heating current path may be otherwise provided. Thus, a wire may be connected to a separate source of current independently of electrode E and its end submerged in material G to provide sufficient heat to cause remelting or refusing of the welding material G and the slag S. Another method of accomplishing this result is to wrap a wire around the electrode E above the solidified slag S to provide an auxiliary current path to the work from electrode E. While a steel wool pad 18 has been illustrated, this is not a necessary part of the invention, although it is a desirable aid thereto. The flow of current may be started simply by putting the wire in contact with the work and withdrawing it therefrom.

The wire used is desirably a metallic wire or rod of such a composition that the small amount that becomes alloyed with the weld metal will do no harm. In most instances a plain low carbon steel welding rod or wire about one-eighth inch in diameter will be satisfactory.

The invention is particularly adaptable to use wherever the mechanical removal of a non-conductive slag from the end of the electrode is liable to result in breaking of the electrode. This condition is encountered most frequently when carbon or graphite electrodes are used in the presence of a fairly large amount of flux or welding material, but would be encountered also if metal electrodes were used if such electrodes were covered with comparatively fragile coatings containing alloys that are necessary to produce the desired composition of the weld metal. In the latter case, when it is attempted to remove the solidified slag mechanically, the forceful handling of the electrode will cause pieces of the relatively fragile or brittle coating to break off from the electrode. Consequently, the welding results will be non-uniform due to the fact that portions of the electrode will be bare and other portions will be coated.

While certain embodiments of the invention have been illustrated and described in detail, it will be apparent to those skilled in the art that the invention may be otherwise embodied, and the dimensions and interrelations of parts changed without departing from the spirit and scope of the invention as defined in the appended claims.

What is claimed is:

1. In a welding operation in which the end of a fusible electrode is inserted beneath a blanket of welding material, which is a poor conductor when cold, and an electric current flows along a main path from the end of said electrode through said welding material to the work to be welded and is of sufficient magnitude to melt progressive portions of said electrode and to fuse at least a portion of said material, the method of re-starting the flow of electric current between such electrode and the work, when such flow of current has been interrupted and fused welding material has solidified and formed a substantially non-conductive slag upon the end of the electrode, which comprises establishing an auxiliary path for the flow of electric current through said welding material from said electrode to the work to refuse such welding material and re-establish such main current path.

2. In electric welding operations in which the welding current flows from a source of electric current through a main electrode to the work through a fusible welding material which is a poor conductor when cold and which forms a solidified substantially non-conductive slag on the end of the electrode when the flow of current is interrupted; the method of re-establishing the flow of welding current to the work which comprises placing an auxiliary electrode in operative association with said source of current and the work, and causing current to flow from said auxiliary electrode through said material to the work to refuse said solidified material and permit the flow of welding current from said main electrode to the work.

3. The method of refusing welding material which is a poor conductor when cold and which has been fused and has solidified upon the operative end of a welding electrode which comprises heating said material by an electric current flowing along a highly conductive path in parallel with said electrode.

4. The method of refusing welding material which is a poor conductor when cold and which has solidified upon the end of an electrode inserted in said material due to the interruption of the flow of current along a main path including said electrode and said material which comprises passing electric current through an unfused portion of said material along an auxiliary, highly conductive path independently of said electrode.

5. Electric welding apparatus comprising, in combination, a welding electrode; a pair of contact jaws engaging said welding electrode to conduct electric current thereto; and a metallic wire secured to at least one of said contact jaws and extending therebeyond.

6. Electric welding apparatus comprising, in combination, a main electrode; a pair of current-carrying contact jaws engaging said main electrode; and an auxiliary electrode operatively associated with at least one of said jaws, the portion of said jaw engaging said main electrode being formed with a groove to operatively receive said auxiliary electrode.

7. Electric welding apparatus comprising, in combination, a main electrode; an auxiliary electrode; a pair of current-carrying contact jaws operatively engaging said main electrode, one of said jaws being formed with a passage operatively receiving said auxiliary electrode; and means for retaining said auxiliary electrode in said passage.

8. Electric welding apparatus comprising, in combination, a main electrode; a current-carrying contact jaw operatively engaging said main electrode, said jaw having a passage extending longitudinally therethrough; a coil of wire, one end of which extends through said passage and beyond said jaw; and means for maintaining said wire in fixed position in said passage.

9. Electric welding apparatus comprising, in combination, a main electrode; current-conducting means operatively associated with said main electrode; and an auxiliary electrode having one end operatively secured to said means in spaced relation to said main electrode, the free end of said auxiliary electrode being bent to extend beneath and in spaced relation to the lower end of said main electrode.

10. Electric welding apparatus comprising, in combination, a main electrode; a current-carrying contact jaw having a face operatively engaging said main electrode; a groove formed in said face; and an auxiliary electrode disposed in said groove in engagement with said main electrode and said contact jaw.

11. Electric welding apparatus as claimed in claim 10, in which one end of said auxiliary electrode extends beyond said contact jaw and the end of said main electrode, the end of said auxiliary electrode being bent away from said main electrode to extend in spaced substantially parallel relation thereto.

12. Electric welding apparatus comprising, in combination, a main electrode; a current-carrying contact jaw operatively engaging said main electrode, said jaw having a passage drilled therethrough at an angle to the axis of said main electrode; and a coil of wire, one end of which extends through said passage and beyond said jaw to a point adjacent to but not in contact with the operative end of said main electrode.

13. Electric welding apparatus as claimed in claim 12, including releasable means for maintaining said wire in fixed position in said passage.

HARRY SHRUBSALL.